US011708010B2

(12) United States Patent
Haase et al.

(10) Patent No.: US 11,708,010 B2
(45) Date of Patent: Jul. 25, 2023

(54) OPERATING METHOD FOR A THERMO-MANAGEMENT MODULE

(71) Applicant: MAHLE International GmbH, Stuttgart (DE)

(72) Inventors: Kristian Haase, Leinfelden-Echterdingen (DE); Holger Ulrich, Korntal-Muenchingen (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 17/705,314

(22) Filed: Mar. 26, 2022

(65) Prior Publication Data

US 2022/0305955 A1    Sep. 29, 2022

(30) Foreign Application Priority Data

Mar. 26, 2021    (DE) ...................... 10 2021 203 031.9

(51) Int. Cl.
*B60L 58/26* (2019.01)
*B60R 16/033* (2006.01)
(Continued)

(52) U.S. Cl.
CPC .............. *B60L 58/26* (2019.02); *B60K 11/02* (2013.01); *B60R 16/0231* (2013.01); *B60R 16/033* (2013.01)

(58) Field of Classification Search
None
See application file for complete search history.

(56) References Cited

U.S. PATENT DOCUMENTS 5,583,844 A * 12/1996 Wolf .................... G05B 19/425
                                                    701/1
11,511,647 B2 * 11/2022 Del Core .............. H01M 10/44
(Continued)

FOREIGN PATENT DOCUMENTS

DE    102006040187 A1    3/2008
DE    102014008690 A1    12/2015
(Continued)

OTHER PUBLICATIONS

U.S. Appl. No. 17/705,312, filed Mar. 26, 2022, Kristian Haase.

*Primary Examiner* — Jared Fureman
*Assistant Examiner* — Joel Barnett
(74) *Attorney, Agent, or Firm* — Ewers IP Law PLLC; Falk Ewers

(57) ABSTRACT

A method for operating a thermo-management module for a motor vehicle, wherein the module includes switching over a control unit between a first operating mode and at least a second operating mode, passing on in the first operating mode, control commands received from the vehicle field bus by the control electronics for actuation of the respective functional component directly to the component field bus, in at least one second operating mode, processing control commands received from the vehicle field us by the control electronics, so that the actuation of the functional components is carried out in a self-sufficient manner by the control unit. In addition, thermo-management module includes a component carrier, electrically controllable functional components, and an electric control unit for controlling the functional components.

15 Claims, 3 Drawing Sheets

(51) Int. Cl.
*B60K 11/02* (2006.01)
*B60R 16/023* (2006.01)

(56) References Cited

U.S. PATENT DOCUMENTS

| | | | |
|---|---|---|---|
| 2008/0047688 A1 | 2/2008 | Ebigt et al. | |
| 2020/0283004 A1* | 9/2020 | Avetisian | B60R 16/0231 |
| 2021/0392077 A1 | 12/2021 | Laengst et al. | |

FOREIGN PATENT DOCUMENTS

| | | |
|---|---|---|
| DE | 102015203028 A1 | 8/2016 |
| DE | 102018131134 A1 | 6/2020 |
| DE | 102019201607 A1 | 8/2020 |

* cited by examiner

OPERATING METHOD FOR A THERMO-MANAGEMENT MODULE

CROSS REFERENCE TO RELATED APPLICATIONS

This application claims priority to German patent application DE 10 2021 203 031.9, filed May 26, 2021, the entire content of which is incorporated herein by reference.

TECHNICAL FIELD

The disclosure relates to a method for operating a thermo-management module for a motor vehicle and a thermo-management module which is set up/programmed for carrying out this method. The disclosure further relates to a motor vehicle with such a thermo-management module.

BACKGROUND

So-called thermo-management modules are understood to mean devices which, in a vehicle, in particular with an electrical energy storage device and with an electric drive motor, serve to transport heat. In these thermo-management modules typically a plurality of so-called functional components such as for instance electric pumps and electrically controllable valves are arranged. Furthermore, in such a module typically a plurality of sensors, in particular pressure- and temperature sensors, are installed, which generate sensor data.

In particular operating situations, it can be expedient here that individual functional components can be controlled independently of one another, for example via a vehicle field bus of the motor vehicle, in which the thermo-management module is installed. In other operating situations, however, it proves to be advantageous if the actuation of the functional components takes place in a manner coordinated with one another.

SUMMARY

It is therefore an object of the present disclosure to provide an operating method for a thermo-management module of the type mentioned in the introduction, which can be controlled in a flexible manner with regard to the type of actuation of the individual functional components, in particular in terms of the self-sufficiency of the actuation with respect to the vehicle and its vehicle field bus. Moreover, a further object of the present disclosure is to provide a thermo-management module which is set up for carrying out such an improved operating method.

The object is achieved by a method for operating a thermo-management module for a motor vehicle, a thermo-management module, and a motor vehicle, as described herein.

A general idea of the method according to the disclosure is, accordingly, to configure a control unit for controlling the functional components of a thermo-management module so as to be operable in two different operating modes and so as to be able to be switched between these. In a first operating mode, control commands received from a vehicle field bus are not evaluated by the control unit or respectively its control electronics, but rather, for actuating the respective functional components, are passed on directly to a component field bus to which the functional components are connected. This allows the functional components to be actuated directly from the vehicle field bus. If different bus systems are used for the vehicle field bus—for example a CAN bus as vehicle field bus and a LIN bus as component field bus, then the control unit can, as it were, "translate" here the control commands received from the vehicle field bus or respectively CAN bus, so that these are further processed on the component field bus or respectively LIN bus. In the first operating mode, the commands received from the vehicle field bus remain unchanged by the control unit, however, as regards content on passing on to the component field bus.

By comparison, in a second operating mode, control commands received from the vehicle field bus are not "passed through" by the control unit as in the first operating mode, therefore passed on unchanged as regards content, but rather are processed by the control electronics of the control unit. During this processing of the superordinate commands received from the vehicle field bus, corresponding individual commands can be sent by the control unit to the functional components via the component field bus. In this way, the thermo-management module can be operated largely autonomously. In particular, it is no longer necessary, as in the first operating mode, to send so-called "low-level" commands from the vehicle field bus directly and unprocessed to the functional components; rather, it is sufficient to send to the control unit only superordinate commands, which activate or change for example a particular function mode of the thermo-management module or one or more of its functional components, which can refer in particular to the interaction of several functional components. The individual control of the functional components necessary for the implementation of such a function mode is undertaken here in the second operating mode by the control unit. Such a "modular" control of the functional components simplifies the actuation of the thermo-management module via the vehicle field bus. In addition, through the provision of the two operating states, explained above, the thermo-management module can be actuated with a high degree of flexibility.

In the method according to the disclosure, a thermo-management module according to the disclosure is actuated. This comprises a component carrier and at least two, typically several electrically controllable functional components for controlling the temperature of at least one vehicle component of a motor vehicle, which are typically connected detachably or securely to the component carrier. The module further comprises at least one electric control unit which, for the electric controlling of at least two, typically several, particularly typically all, of the functional components, has control electronics electrically connected via a component field bus to the respective functional component and arranged in a housing of the control unit. The control electronics are connected here electrically and in a data-transmitting manner to a vehicle field bus of the motor vehicle which is equipped with the thermo-management module. According to the disclosure, the control unit of the module is able to be switched over between a first and at least a second operating mode. In the first operating mode, control commands received from the vehicle field bus are passed on by the control electronics for actuating the respective functional component directly to the component field bus and, in so doing, remain unchanged here at least with regard to content. By comparison, in the second operating mode, control commands received from the vehicle field bus are firstly processed by the control electronics as so-called superordinate control commands, which means that the individual controlling of the respective functional components is carried out by the control unit.

According to an exemplary embodiment of the method, in the at least one second operating mode, the control unit controls at least one functional component, typically several functional components, in reaction to at least one superordinate control command received from the vehicle field bus. Thus, it is not necessary to convey a plurality of individual commands to the respective functional component. Rather, the detailed actuation of the respective functional component can take place via the control unit or respectively from the latter. Superordinate control commands which can activate or change or deactivate a superordinate function mode of the thermo-management module, can thus be conveyed from the vehicle field bus to the control unit, where they are processed for the individual controlling of the individual functional components. Depending on the model series of the thermo-management module, the individual controlling of the functional components installed in the thermo-management module can be adapted individually. By comparison, superordinate commands which are conveyed via the vehicle field bus to the control unit can also be used uniformly for various model series. This simplifies the actuation of different model series of the thermo-management module which may differ from one another in particular in the composition or respectively individual controlling of individual functional components, as the individual composition of the thermo-management module of different functional components can remain unconsidered in the generating and sending of a superordinate control command to the control unit.

Particularly typically in the at least one second operating mode, no commands provided by the vehicle field bus are processed by the functional components. This assists the multi-stage approach, explained above, in which the functional components require no direct communication connection to the vehicle field bus.

Particularly expediently, also in the first operating mode the control unit actuates the functional components which are not connected to the component field bus. It is thus prevented that the functional components which are not connected to the component field bus have to remain unconsidered with regard to their actuation in the first operating mode.

According to an advantageous further development, the control unit is set up/programmed in the at least one second operating state for carrying out at least one function mode, typically two or more function modes, of the thermo-management module. In this further development, in the at least one function mode the actuation of at least one, typically several functional component(s) takes place, independently of the vehicle field bus. The actuation can typically take place according to a control strategy or regulating strategy which is predetermined and associated with the respective function mode. According to such a control strategy or respectively regulating strategy, two or more functional components can also be actuated. Of course, two or more such control strategies or respectively regulating strategies can also be associated with a respective function mode.

According to a further advantageous further development, in the at least one function mode at least one control loop with at least one control variable and with at least one actuating variable, adjustable in a functional component, can be carried out by the control unit. In this further development, in addition, a target value of the at least one control variable can be provided as superordinate control command from the vehicle field bus to the control unit and actuated by the control unit for the setting of the actuating variable of the respective functional component. Thereby, the regulating of said functional component(s) can be carried out autonomously with the control unit, into which a corresponding control algorithm can be integrated by software. In particular, no monitoring of the control algorithm via the vehicle field bus is necessary. On the other hand, superordinate commands, which may relate in a more general manner to the implementation of the control loop, can be received via the vehicle field bus. The already mentioned variation of a particular control variable is also to be included in this.

According to an advantageous further development, the control unit is able to be switched over into a third operating state. In this further development, the setting of the at least one function mode takes place in the second operating mode, in particular the switching over from one set function mode into another function mode, with a superordinate control command received by the control unit from the vehicle field bus. In the third operating mode, the setting of the at least one function mode, in particular the switching over from one set function mode into another function mode, takes place automatically by the control unit, in particular without receiving a corresponding superordinate control command from the vehicle field bus. The third operating mode thus permits, compared to the second operating mode, an operation of the thermo-management module with increased self-sufficiency.

According to another exemplary embodiment, in the at least one second operating mode, in particular in the second or third operating mode, the actuation of the functional components comprises the receiving and evaluating of sensor signals of at least one of the functional components through the control unit.

The disclosure further relates to a thermo-management module which is set up/programmed for carrying out the method which is presented above. The advantages, explained above, of the method according to the disclosure are therefore also transferred to the thermo-management module according to the disclosure.

A general idea in the thermo-management module according to the disclosure is, accordingly, to realize in a modular manner the electrical wiring and, associated therewith, also the electric control of the thermo-management module explained above. For this, it is provided to realize the electrical wiring, in particular an electrical connection of the individual functional components of the module to an electric power supply of a motor vehicle and to the field bus of a motor vehicle via the shared electric control unit with control electronics, already explained above. This means that the controlling and also the electric power supply of all the functional components included by the thermo-management module take place via this control unit. Such a control unit possesses, according to the disclosure, control electronics, having electronic or/and electric components, which can be connected to the vehicle field bus of the motor vehicle using the module and itself in turn is connected via its own component field bus to at least one, typically to two or to several, of the functional components of the thermo-management module in a data-transmitting manner. The controlling of the functional components can thus take place in a substantially self-sufficient manner through the control unit. The actuation of the control unit, in turn, can take place via the vehicle field bus which is connected to the control unit.

In particular via the vehicle field bus, as already described above in the context of the second operating mode of the method according to the disclosure, superordinate commands can thus be sent to the control unit, which can correspond to a particular operating state of the module.

The individual control of the functional components necessary for implementing the second operating state can then be undertaken by the control electronics of the control unit, without a communication with the vehicle field bus being necessary for this. However, the first operating mode, explained above, can also be realized with the thermo-management module according to the disclosure.

The thermo-management module according to the disclosure comprises a component carrier and at least two, typically several, electrically controllable functional components for the temperature control of at least one vehicle component of a motor vehicle, wherein the functional components are detachably or securely connected to the component carrier. The module further comprises at least one electric control unit, which has control electronics for the electric controlling of at least two, typically several, particularly typically all, of the functional components.

According to the disclosure, the control electronics are electrically connected to the respective functional component via a component field bus. Furthermore, the control electronics are able to be connected, or are connected electrically and in a data-transmitting manner to a vehicle field bus of the motor vehicle which is equipped with the thermo-management module. In addition, the control electronics are arranged in a housing of the control unit.

According to an exemplary embodiment, the housing of the control unit is fastened detachably or non-detachably on the component carrier or/and on at least one of the functional components.

According to an exemplary embodiment, the detachable fastening of the housing is realized with at least one screw connection or/and clip connection or/and detent connection. Alternatively or additionally, thereto, the non-detachable fastening of the housing can be realized with at least one rivet connection or/and solder connection or/and weld connection. These measures facilitate the mounting of the control unit on the component carrier.

According to an exemplary embodiment, an electric input connection is provided on the housing. With the electric input connection, the control electronics can be connected to a vehicle field bus electrically and in a data-transmitting manner and electrically to an electric power supply of the motor vehicle. In this embodiment, the input connection can be electrically connected, via an input plug connection arranged on the housing, to the vehicle field bus and to the electric power supply of the motor vehicle. This measure facilitates the electrical wiring, including the securing of an electrical connection from the control unit to the vehicle field bus of the motor vehicle or respectively its electrical power supply.

According to an advantageous further development, the input plug connection has an input plug socket mounted on the housing. An input plug, configured in a complementary manner to the input plug socket, with electrical connection lines to the electric power supply or respectively to the vehicle field bus, is able to be inserted or respectively is inserted into said socket. This measure also facilitates the assembly of the module of the functional components, the control unit and the component carrier.

According to an advantageous further development, the control unit comprises at least one electric power supply line, connected electrically to the control electronics, for supplying the control electronics with electrical energy. In this further development, the at least one electric power supply line is electrically connected to the input connection, arranged on the housing, for electrical connecting to the electric power supply of the motor vehicle, and to a supply output connection, likewise arranged on the housing, for electrical connecting and supplying of at least one functional component, typically at least two, particularly typically all, of the functional components with electrical energy. In this way, the electric power supply of the motor vehicle can be used both for the electrical energy supply of the control unit and also of the functional components which are controlled by the control unit. A complex wiring for connection of the individual functional components directly to the electric power supply of the motor vehicle can thus be dispensed with in this way.

Particularly typically, and electric control output connection can be provided on the housing. With this control output connection, at least one, typically several, particularly typically all, of the electric control line paths and also the component field bus can be electrically connected to the control electronics. With this measure, electric line paths between the control unit and the functional components controlled by the control unit can also be kept short, whereby the need for installation space is further reduced and material costs are saved.

Expediently, the electric control output connection and the supply output connection can be able to be connected or respectively connected electrically to the functional components via a shared output plug connection, arranged on the control housing, with an output plug socket and with an output plug complementary thereto. This measure simplifies the assembly of the module and also facilitates its electrical wiring. Furthermore, the use of a shared plug for power supply- and command or respectively signal transmission reduces the need for installation space on the housing for the connection of the corresponding control or respectively signal or/and sensor lines.

Alternatively or additionally, it is also conceivable in this variant that the electric control output connection and the supply output connection are able to be connected or respectively are connected via two output plug connections which are separately formed and are arranged on the control housing, respectively with a separate plug socket and with a separate output plug, respectively complementary thereto. Thereby, the control unit can be adapted particularly flexibly to different structural forms of the thermo-management system with regard to the use of different plug connections or respectively plugs and plug sockets complementary thereto.

According to an advantageous further development, the at least one power supply line can comprise a first electric power supply line and a second power supply line, which are designed for transmitting different electrical outputs. It is conceivable, for example, to design the first power supply line for the transmission of electrical outputs up to a maximum of 1 kW, so that this is suitable for the electrical energy supply of function carriers formed by pumps. Considerably less electrical output is required, on the other hand, for the adjusting of electrically operated valves. Therefore, it is conceivable to design the second electric power supply for the transmitting of outputs up to a maximum of 10 W.

In the solution which is provided here, the power supply lines can be guided from the functional component through the housing of the control unit and thus connected with the electric power supply of the motor vehicle via the input connection of the control unit. It is conceivable here that the electric and electronic components of the control electronics are also connected to the electric power supply line, in order to be able to be supplied with an electric power supply in this way.

According to an advantageous further development, the module can have at least one functional component of a cooling circuit, which is able to be flowed through by cooling fluid. The cooling fluid can be coolant and/or refrigerant. The at least one functional component realizes here an essential or respectively indispensable fluid technology function in the cooling circuit, such as for example a cooling or a collecting or a condensing of the cooling fluid. On the other hand, typically no essential or respectively indispensable fluid technology function is assigned in the cooling circuit of the vehicle. The component carrier is thereby designed in a robust and trouble-free manner. In addition, the at least one functional component can, if required, be exchanged independently of further functional components and of the component carrier. As a whole, through the component nodes according to the disclosure, a space-saving, robust and economical solution is provided.

Advantageously, the module can have several functional components which are able to be integrated into the cooling circuit of the motor vehicle and are able to be flowed through by cooling fluid. Here, on the component carrier, respectively a component interface can be formed for each functional component, via which the respective functional component is detachably fastened to the component carrier. Advantageously, the component interface can be adapted for receiving the at least one functional component.

Advantageously, the at least one functional component can be formed by a compensating container, able to be connected to a cooling circuit, for the collecting of cooling fluid. Advantageously, the at least one functional component can be formed by a pump which is able to be connected into the cooling circuit. Advantageously, the at least one functional component can be formed by chiller which is able to be connected into the cooling circuit. Advantageously, the at least one functional component can be formed by a heat exchanger which is able to be connected into the cooling circuit. Advantageously, the at least one functional component can be formed by a valve which is able to be connected into the cooling circuit. Advantageously, the at least one functional component can be formed by a filter which is able to be connected into the cooling circuit. Advantageously, the at least one functional component can be formed by an indirect condenser which is able to be connected into the cooling circuit. Advantageously, the at least one functional component can also be formed by a different component which is able to be connected into the cooling circuit.

The disclosure further relates to a motor vehicle with an internal combustion engine or/and with an electric drive. The motor vehicle can therefore be a vehicle which is driven exclusively by an internal combustion engine. However, the motor vehicle can also be a hybrid or electric vehicle. The motor vehicle according to the disclosure further comprises a temperature-control circuit for controlling the temperature of at least one component of the motor vehicle, in particular an electric battery or/and a battery-electric drive of the motor vehicle, wherein the temperature control circuit has a thermo-management module according to the disclosure, explained above. The advantages, explained above, of the thermo-management module according to the disclosure or respectively of the method according to the disclosure are therefore also transferred to the motor vehicle according to the disclosure.

Further important features and advantages of the disclosure will emerge from the drawings and from the associated figure description with the aid of the drawings.

It shall be understood that the features mentioned above and to be explained further below are able to be used not only in the respectively indicated combination, but also in other combinations or in isolation, without departing from the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
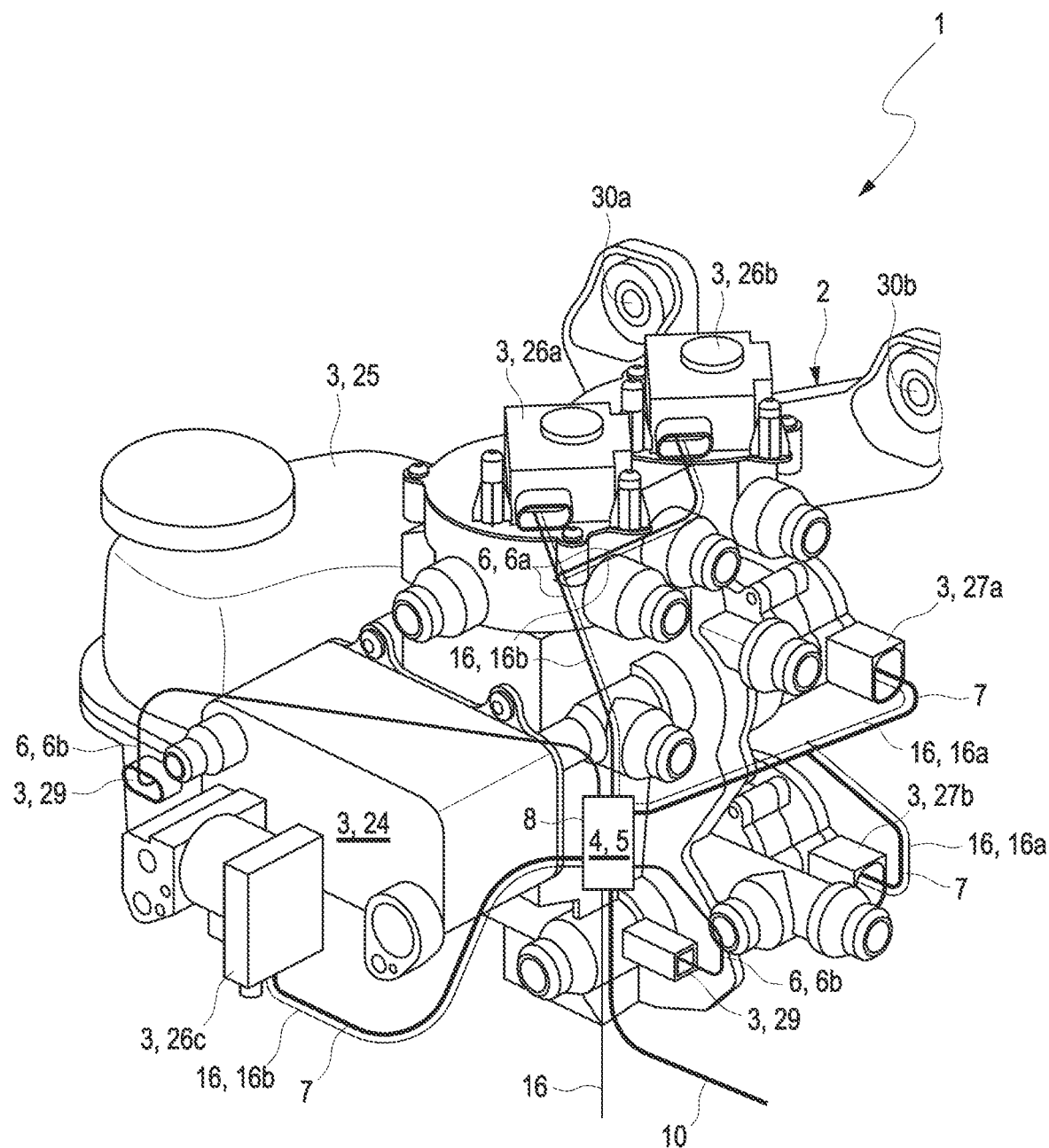
FIG. 1 shows a thermo-management module for a motor vehicle according to an exemplary embodiment of the disclosure.

Exemplary embodiments of the disclosure are illustrated in the drawings and are explained further in the following description, wherein the same reference numbers refer to identical or similar or functionally identical components.

Figure 2:
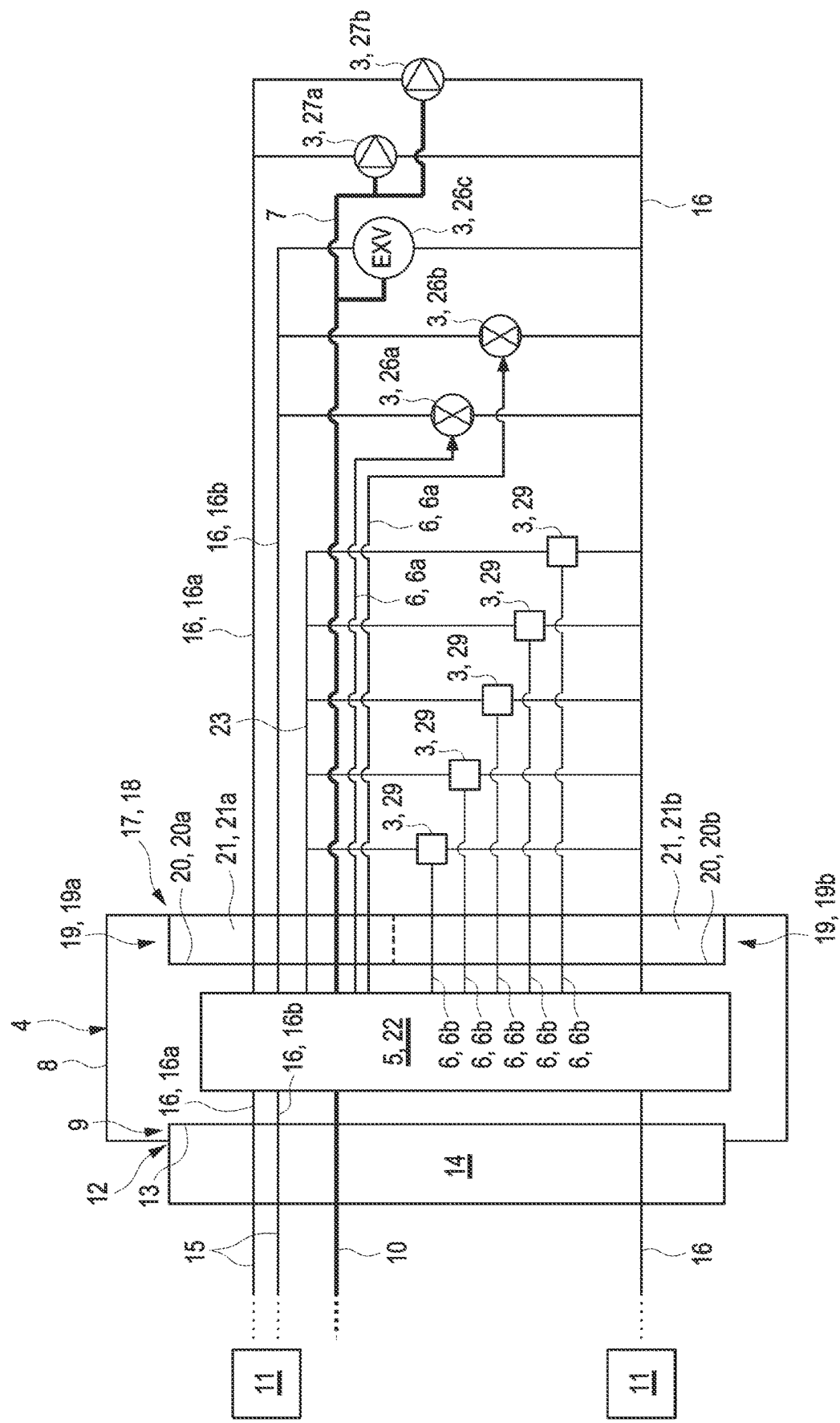
FIG. 2 shows a possible electrical wiring of the module of FIG. 1, in circuit-diagram-like illustration.

FIG. 1 shows in a perspective view by way of example a thermo-management module 1 according to the disclosure for a motor vehicle, in particular with an electric drive motor and with an electrical energy storage device. The vehicle can be, for example, a purely battery-electrically driven vehicle or a fuel cell vehicle or a hybrid vehicle. FIG. 2 shows, in a circuit-diagram-like illustration, a possible electrical wiring of the module 1 of FIG. 1.

The module 1 has, according to FIGS. 1 and 2, a component carrier 2 and several electrically controllable functional components 3. In this example embodiment, the functional components 3 are a chiller 24, a compensating container 25, three valves 26a, 26b, 26c—wherein the two valves 26a, 26b concern respectively a magnetic valve and the valve 26c concerns an expansion valve—and two pumps 27a and 27b. The functional components 3 of the module 1 and, if applicable, further components are fluidically connected to one another as part of a cooling circuit which is not illustrated further. Further functional components 3 can be temperature sensors 29, for example for measurement of the temperature of another functional component 3, of which only two temperature sensors 29 are illustrated in FIG. 1 for the sake of clarity.

The component carrier 2 is designed for carrying the functional components 3 and has a suitable mechanical component interface for the respective functional component 3. The respective component interface can be adapted here to the respective form and the size and the function of the respective functional component 3. A respective functional component 3 is then detachably fastened to the component carrier 2 via the respective component interface. However, a secure, therefore non-detachable, fastening is also conceivable. A fastening interface can be formed in addition on the component carrier 2, via which the component carrier 2, and thereby the module 1, is able to be fastened to a body of the vehicle. The fastening interface is formed in the example embodiment by two openings 30a and 30b.

According to FIG. 1, the module 1 further comprises a schematically illustrated control unit 4, which has for the electric controlling of the functional components 3 control electronics 5 (only indicated roughly schematically in FIG. 1) with electric and electronic components and is arranged in a housing 8 of the control unit 4. The housing 8 of the control unit 4 can also be fastened detachably or non-detachably to the component carrier 2. A detachable fastening of the housing 8 can be realized for instance with a screw connection, clip connection or detent connection. A non-detachable fastening of the housing 8 can be realized for example with a rivet connection, solder connection or weld connection.

Reference is made in the following to the circuit-diagram-like illustration of FIG. 2. The control electronics 5 can be arranged accordingly on a board 22 which is present in the housing 8, or can comprise such a board 22. The control electronics 5 can be further connected electrically via electric control line paths 6 and via a component field bus 7—typically via a LIN bus—to the respectively functional component 3. The control line paths 6 can concern electric control lines 6a, which serve for the controlling of the respective functional component 3. Control signals can be transmitted to a respective functional component 3 via the control lines 6a. However, the control line paths 6 can also concern sensor or respectively signal lines 6b, via which electric sensor signals can be transmitted to the control unit 4 or respectively control electronics 5 from the respective functional component 3—for example from the temperature sensors 29. A control of this functional component 3 can also take place via the component field bus 7 through uni- or bi-directional data transmission between the respective functional component 3 and the control unit 4 or respectively the control electronics 5.

In the example scenario of FIG. 2, the two valves 26a, 26b are actuated via the control lines 6a, whereas the expansion valve 26c is connected to the component field bus 7 and consequently is actuated by the control unit 4 via the component field bus 7. In the example, the two pumps 27a and 27b are also connected to the component field bus 7 and are thus actuated by the control unit 4 via the component field bus 7.

According to the example scenario in accordance with FIG. 2, an electric input connection 9 is provided on the housing 8 of the control unit 4, with which the control electronics 5 can be connected electrically and in a data-transmitting manner to a vehicle field bus 10—typically to a CAN-bus—of the motor vehicle using the module 1, and electrically to an electric power supply 11 of this motor vehicle. The input connection 9, in turn, can be connected electrically, in turn, to the vehicle field bus 10 and to the electric power supply 11 of the motor vehicle via an input plug connection 12 arranged on the housing 8. Said input plug connection 12 can comprise an input plug socket 13 mounted on the housing 8, into which an input plug 14 can be inserted, formed in complementary manner to the input plug socket 13, with electric connection lines 15 to the electric power supply 11 or respectively to the vehicle field bus 10.

Furthermore, the control unit 4 can comprise an electric power supply line 16, connected electrically to the control electronics 5, for supplying the control electronics 5 and also the functional components 3 with electrical energy. For this, the electric power supply line 16 is directed electrically to the input connection 9 and to a supply output connection 17, likewise arranged on the housing 8, with which the power supply line 16 can be electrically connected for electric power supply to at least one functional component 3.

In the example scenario, the power supply line 16 comprises a first power supply line 16a and a second power supply line 16b, which are designed for transmitting different electrical outputs.

For example, the first electric power supply line 16a can be designed for transmitting a maximum electrical output of up to 1 kW, whereas the second electrical power supply line 16b can be designed only for transmitting a maximum electrical output of a few Watts. Optionally, an electrical low voltage—in particular of 5 Volt or 12 Volt—can also be provided directly from the control electronics 5 or respectively board 22 to different component carriers 3 with very low electric output consumption—in the example scenario, these are the temperature sensors 29. For this, electric low voltage lines 23 can be provided from the control electronics 5 or respectively from the board 22 running to the respective functional components 3.

In addition, an electric control output connection 18 is provided on the housing 8, with which all of the electric control line paths 6 and the component field bus 7 can be electrically connected to the control electronics 5.

According to FIG. 2, the electric control output connection 18 and the supply output connection 17 are electrically connected, via a shared output plug connection 19 arranged on the housing 8, with an output plug socket 20 and with an out-put plug 21 complementary thereto, with the functional components 3.

In a variant which is not shown, the electric control output connection 18 and the supply output connection 17 can be electrically connected to the functional components 3 via two separately configured output plug connections 19a, 19b, arranged on the housing 8, respectively with a separate plug socket 20a, 20b and with a separate output plug 21a, 21b respectively complementary thereto. The above-mentioned electric low voltage line 23 can also be integrated into the supply output connection 17.

Figure 3:
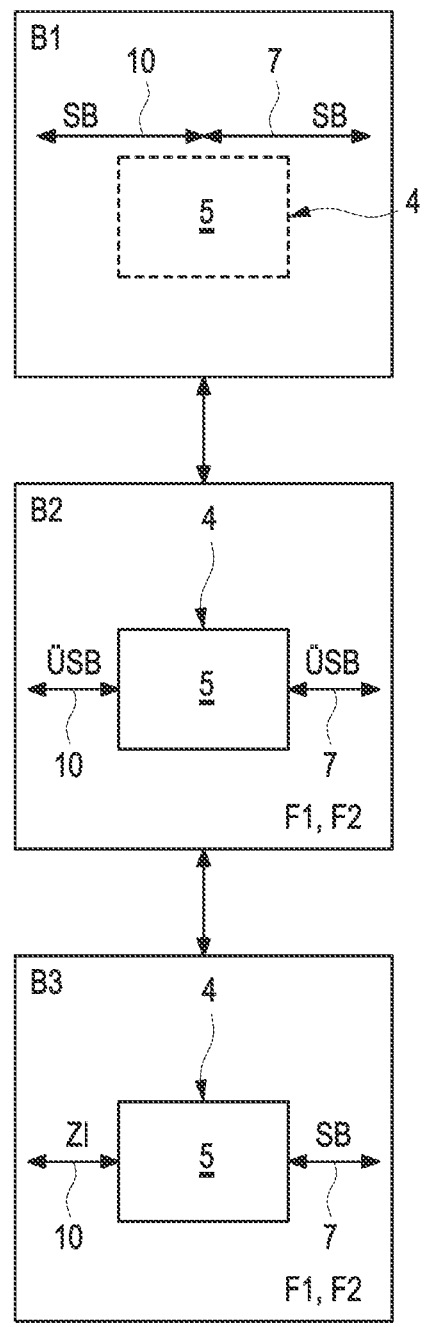
FIG. 3 shows a diagram-like illustration, illustrating the different possible operating modes of the thermo-management module.

Reference is made in the following to the diagram according to FIG. 3. As the illustration of FIG. 3 shows, the control unit 5 is able to be switched over between a first, second and third operating mode B1, B2, B3. In the first operating mode B1, control commands SB received from the vehicle field bus 10—a CAN-bus 10 in the example—are not changed by the control electronics 5, but rather are passed on directly to the component field bus 7—a LIN-bus in the example—for the actuation of the respective functional component 3. In the second operating mode B2, on the other hand, control commands SB received from the vehicle field bus 10 are processed as superordinate control commands ÜSB by the control electronics 5. This means that the actuation of the functional components 3 is carried out in a self-sufficient manner from the control unit 5 with respect to the vehicle field bus 10. When different bus systems are used for vehicle field bus 10—for example a CAN-bus as vehicle field bus and a LIN-bus as component field bus, the control unit 5 can, as it were, "translate" the control commands received from the vehicle field bus 10 or respectively CAN-bus, so that these are further processed on the component field bus 7 or respectively LIN-bus. As regards content, in the first operating mode the commands received from the vehicle field bus 10 remain unchanged, however, by the control unit 5 in the passing on to the component field bus 7.

By comparison, in the second operating mode B2—and also in the third operating mode B3—no control commands provided by the vehicle field bus 10—are directly processed by the functional components 3. Rather, in the second operating mode B2 and also in the third operating mode B3, the control unit 4 actuates functional components 3 in reaction to superordinate control commands ÜSB received from the vehicle field bus 10. For this, corresponding control commands SB, from the control unit 4 via the component field bus 7 are conveyed to the functional components 3.

Furthermore, the control unit 4 in the second operating state B2 and also in the third operating state b3 can be set up or respectively programmed for carrying out two or more function modes F1, F2 of the thermo-management module 1. In the respective function mode F1, F2, the actuation of the functional components 3 takes place according to a control strategy which is predetermined and is associated with the at least one function mode F1, F2.

For example, in a function mode F1 a control loop with a control variable and with an actuating variable, able to be set in a functional component 3, can be carried out by the control unit 4. Here, a target value of the control variable can be provided as superordinate control command ÜSB from the vehicle field bus 10 to the control unit 4, so that the functional component 3 can be actuated with corresponding control commands SB from the control unit 4 for setting the actuating variable.

In the example of FIG. 3, the control unit 4 can be furthermore switched over into a third operating state B3. In the second operating mode B2, the setting of a particular function mode F1, F2 or respectively the switching over of the currently set function mode F1, F2 into another function mode 3 takes place in reaction to a superordinate control command ÜSB overlaid by the control unit 4 from the vehicle field bus 10. By comparison, in the third operating mode B3, the control unit 4 undertakes both the setting of a particular function mode F1, F2 and also the switching over between two function modes F1, F2, by the control unit 4 automatically, without a correspondingly superordinate control command ÜSB having to be received for this from the vehicle field bus 10. Instead, additional information ZI, which are provided to the control unit 4 via the vehicle field bus 10, can be processed by the control unit 4.

Both in the second operating mode B2 and also in the third operating mode B3, the actuation of the functional components 3 can comprise the receiving and evaluating of sensor signals from at least one of the functional components 3 through the control unit 4, in so far as these sensor signals are not via the component field bus 7 to the control unit 4, but rather only via the control line paths 6.

It is understood that the foregoing description is that of the exemplary embodiments of the disclosure and that various changes and modifications may be made thereto without departing from the spirit and scope of the disclosure as defined in the appended claims.

What is claimed is:

1. A method for operating a thermo-management module for a motor vehicle, wherein the module includes a component carrier, at least two electrically controllable functional components for controlling the temperature of at least one vehicle component of a motor vehicle, which are connected detachably or securely to the component carrier, at least one electric control unit which, for the electric controlling of at least one of (a) at least two function components, and (b) all of the functional components has control electronics electrically connected via at least one electric control line path and via a component field bus to the respective functional component and arranged in a housing, wherein the control electronics are connected electrically and in a data-transmitting manner to a vehicle field bus of the motor vehicle which is equipped with the thermo-management module, the method comprising:

switching the control unit between a first operating mode and at least a second operating mode;

in the first operating mode, passing on control commands received from the vehicle field bus by the control electronics for actuation of the respective functional component, unchanged at least with regard to content, to the component field bus; and in the at least one second operating mode, processing control commands received from the vehicle field bus by the control electronics, so that the actuation of the functional components is carried out by the control unit.

2. The method according to claim 1, wherein in the at least one second operating mode the control unit actuates at least one functional component, in reaction to at least one superordinate control command received from the vehicle field bus via the component field bus or via an electric control line, via which the functional component is connected to the control arrangement.

3. The method according to claim 1, wherein in the at least one second operating mode no commands, provided by the vehicle field bus are passed on by the functional components directly via the component field bus to a functional component.

4. The method according to one of claim 1, wherein in the first operating mode the control unit directly actuates the functional components which are not connected via the component field bus to the control unit.

5. The method according to claim 1, wherein:

the control unit in the at least one second operating state is configured to carry out at least one function mode or two or more function modes, of the thermo-management module, and in the at least one function mode, the actuation of at least one functional component, takes place independently of the vehicle field bus, according to a control strategy which is predetermined and is associated with the at least one function mode.

6. The method according to claim 5, wherein:

in the at least one function mode, at least one control loop with at least one control variable and with at least one actuating variable, able to be set in a functional component is carried out from the control unit, and a target value of the at least one control variable is provided as a superordinate control command from the vehicle field bus to the control unit and the functional component is actuated from the control unit for setting the actuating variable.

7. The method according to claim 1, wherein:

the control unit can be switched over into a third operating state, in the second operating mode, the setting of the at least one function mode, in particular the switching over from one set function mode into another function mode, takes place with a superordinate control command received by the control unit from the vehicle field bus, and in the third operating mode, the setting of the at least one function mode, and the switching over from one set function mode into another function mode, takes place from the control unit automatically, in particular without receiving of a corresponding superordinate control command from the vehicle field bus.

8. The method according to claim 1, wherein in the at least one second operating mode, the actuation of the functional components comprises the receiving and evaluating of sensor signals of at least one of the functional components by the control unit.

9. A thermo-management module for carrying out the method according to claim 1, the thermo-management module comprising:

a component carrier;

at least two electrically controllable functional components for controlling the temperature of at least one vehicle component of a motor vehicle, which are detachably or securely connected to the component carrier; and at least one electric control unit or two electric control units, which for the electric controlling of at least one of (a) at least two functional components, and (b) all of the functional components has control electronics electrically connected via at least one electric control line path and via a component field bus to the respective functional component and arranged in a housing, and wherein the control electronics can be connected or are connected electrically and in a data-transmitting manner to a vehicle field bus of the motor vehicle which is equipped with the thermo-management module.

10. The module according to claim 9, wherein:

on the housing, an electric input connection is provided, with which the control electronics are able to be connected electrically and in a data-transmitting manner to a vehicle field bus and electrically to an electric power supply of the motor vehicle, and the input connection can be electrically connected to the vehicle field bus and to the electric power supply of the motor vehicle via an input plug connection arranged on the housing.

11. The module according to claim 9, wherein:

the control unit comprises at least one electric power supply line, electrically connected to the control electronics, for supplying the control electronics with electrical energy, and the at least one electric power supply line is electrically connected to the input connection, arranged on the housing, for electric connecting to the electric power supply present on the motor vehicle and to a supply output connection, also arranged on the housing, for the electric connecting and supplying with electrical energy of at least one functional component, typically two or more of the functional components.

12. The module according to claim 9, wherein on the housing an electric control output connection is provided, with which at least one of (a) at least one electric control line path, and (b) all of the electric control line paths and the component field bus can be electrically connected to the control electronics.

13. The module according to claim 9, wherein the module has at least one functional component of a cooling circuit of the vehicle, which can be flowed through or is flowed through by cooling fluid, and a component carrier.

14. The module according to claim 9, wherein:

the at least one functional component is formed by a compensating container, which can be connected into a cooling circuit, for collecting cooling fluid, and/or the at least one functional component is formed by a pump which can be connected into the cooling circuit, and/or the at least one functional component is formed by a chiller which can be connected into the cooling circuit, and/or the at least one functional component is formed by a heat exchanger which can be connected into the cooling circuit, and/or the at least one functional component is formed by a valve which can be connected into the cooling circuit, and/or the at least one functional component is formed by a filter which can be connected into the cooling circuit, and/or the at least one functional component is formed by an indirect condenser which can be connected into the cooling circuit.

15. A motor vehicle, comprising:

an internal combustion engine or/and an electric drive; and a temperature control circuit for controlling the temperature of at least one component of the motor vehicle an electric battery or/and a battery-electric drive of the motor vehicle, and wherein the temperature control circuit has a thermo-management module according to claim 9.

* * * * *